United States Patent Office 3,137,100
Patented June 16, 1964

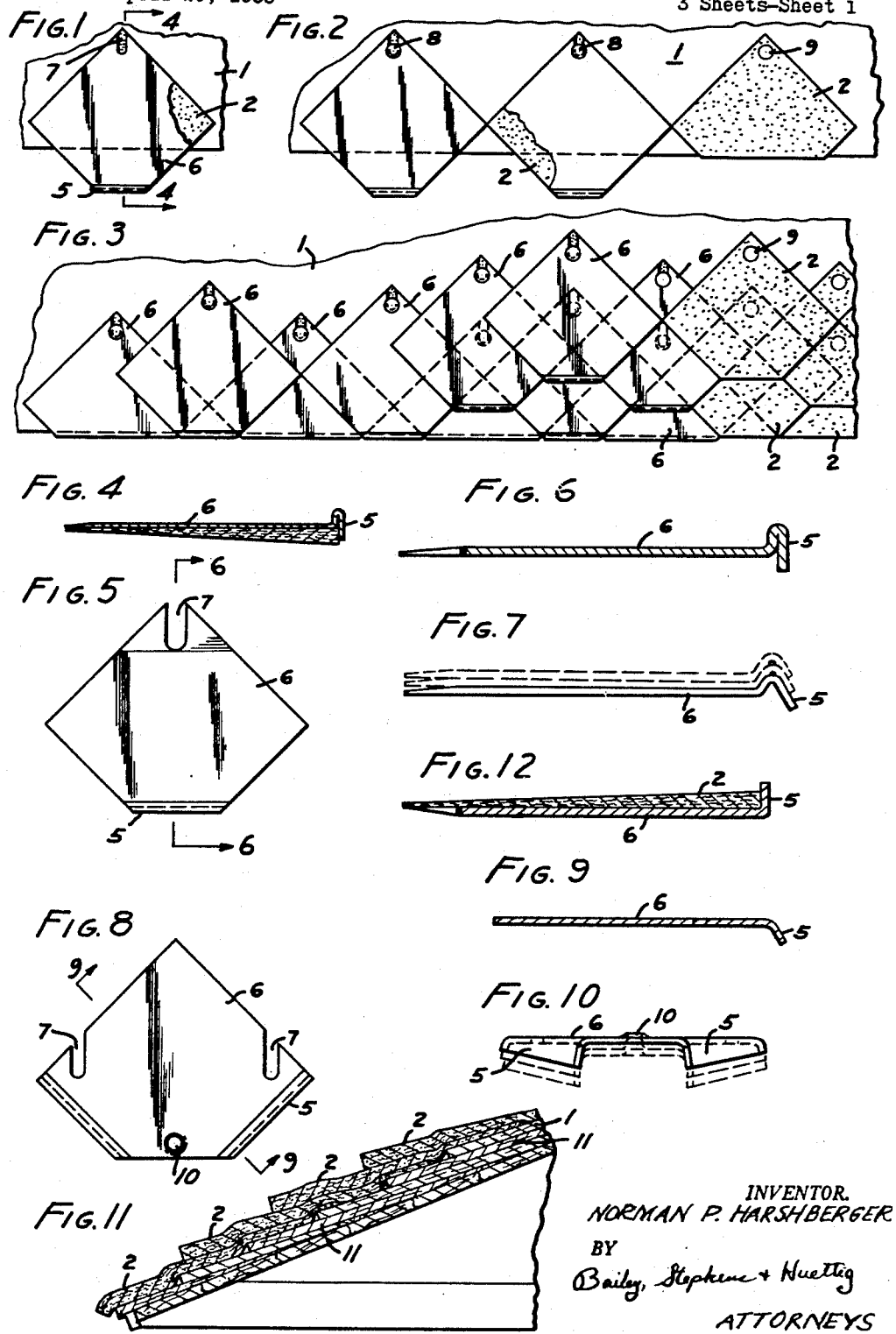

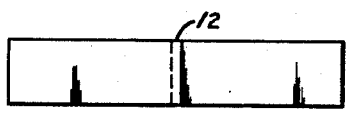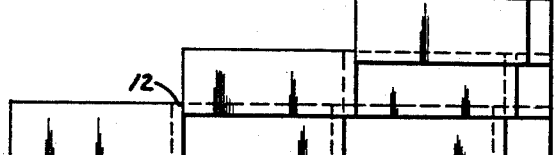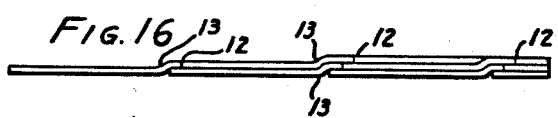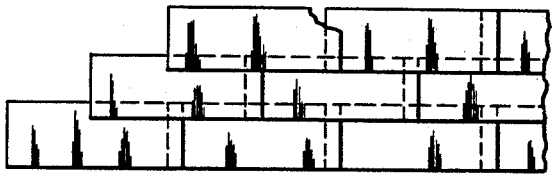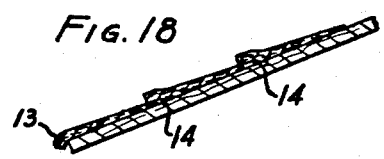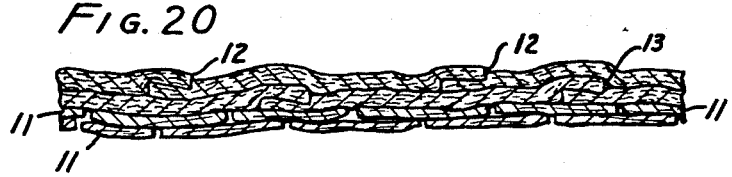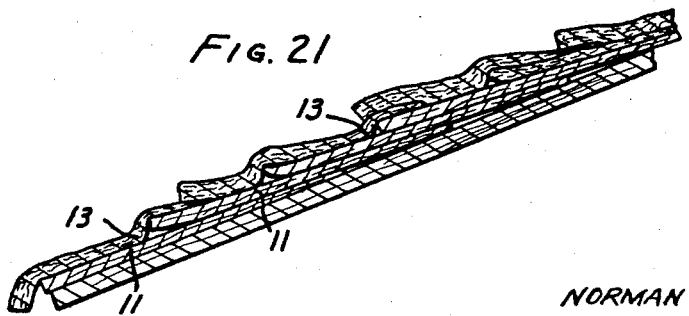

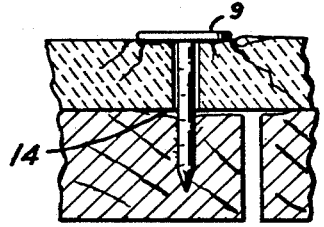
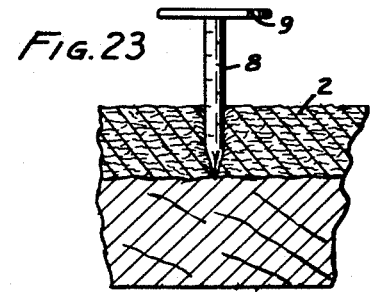
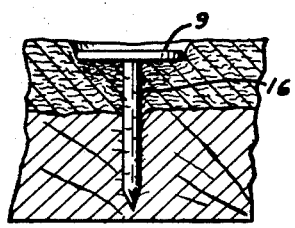
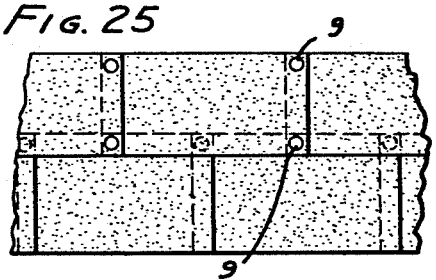
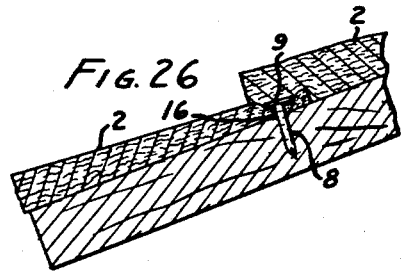
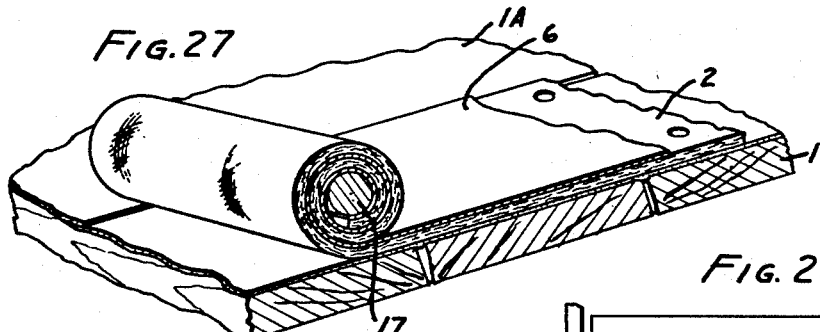
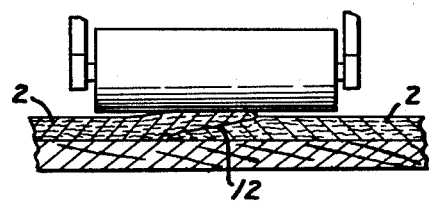
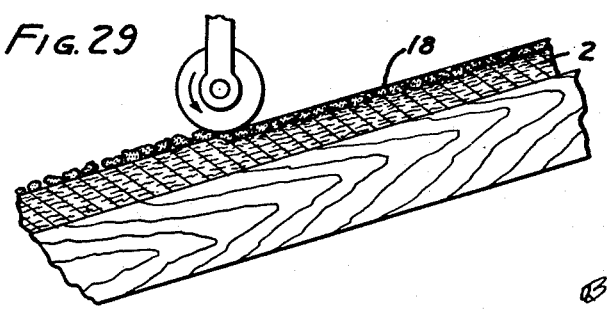
INVENTOR.
NORMAN P. HARSHBERGER
BY
Bailey, Stephens + Nuettig
ATTORNEYS

3,137,100
ROOFING PRODUCT
Norman P. Harshberger, 1446 Las Lunas St.,
Pasadena, Calif.
Filed Apr. 29, 1953, Ser. No. 351,949
11 Claims. (Cl. 50—193)

The present invention is a continuation in part of my copending case Serial Number 188,168 filed September 30, 1950, now Patent No. 2,722,868, and relates to forming roofing slabs or sheets comprising cement, fibre and filler materials. More particularly, however, the present invention is to a method of application of a roofing while the product is still in an unset state, and still subject to flexing, indentation, rolling, compression and easily cut while in that condition.

As those skilled in the art know, cement asbestos shingles have certain disadvantages in their set and hardened state when applied to a surface. The set product is difficult to cut, nail, or otherwise handle due to the brittle nature of the set and cured product. The set and cured product must be cut, punched, before being secured and nailed. Special tools are required, and the equipment for cutting and punching holes must be done at great disadvantage, (away from the spot where they are applied).

Moreover the prepunched nail holes of a brittle product, is frequently the cause of leakage, since the nail does not have a snug fit, and cannot have, since in nailing it would shatter or otherwise fracture, being hard and brittle. In fact the conventional precured, and hardened product has little or no impact strength as compared with my new product so far as it concerns its use in place on a building. The old product known as a "cement asbestos product" has few such advantages as in the form fit features brought about by my new method and product.

It is an object of the present invention to provide a cement slab or sheet having a fair degree of tensile strength and retaining cohesion in its wet unset state, so as to bond to the adjoining surface in overlapping and/or abutt relationship, on a surface.

It is an object of the present invention to retain flexibility in the formed product, and for a period sufficiently long, so as to permit the unset cement fibrous product to substantially conform to the contour of the surfaces to which it is applied.

It is a further object of this invention to provide ample support to the product in its unset state prior to, and during application to surfaces, where final set and support is provided.

Another object is in providing a suitable carrier means for handling the unset fibrous cement product so it may be advantageous to the applicator to lay the product without fracture, one upon another in overlap or abutting fashion on a roof surface.

Another object is in providing a carrier means for handling the unset fibrous cement product, and of a nature which may allow air, gases or other fluids to be withdrawn or pressed through the carrier means while serving as a support for the unset fibrous cement product.

Another object is in providing a carrier means for roofing slabs and sheets which will provide substantial flexing of the formed unset cement product, while still substantially preventing dislocation of the lay of the fibrous binder, and fracture of the unset product, while applying the product to a surface.

Another object is in the ready removal of the carrier at any point, in the steps of making, laying and curing of the unset, unhardened, cement fibrous product when so desired.

A further object is to provide a form fitting unset flexible slab or sheet that becomes set and hard, following placement on a surface, and providing thereby a weatherable protective covering.

Many shingles of the prior art when weathered become curled, warped or otherwise distorted. Asbestos cement shingles are frequently susceptible to curling unless surface nailed at the butt portion.

Stresses are set up in high density shingles of the prior art upon becoming cured and dried, forming at the surfaces an extremely dense crust like concentration of cement. The rate at which a product loses moisture, or conversely takes moisture in, has a bearing on the degree of distortion when later applied to roofs.

In forming my sheet product, I have discovered that I can substantially prevent distortion brought about by methods of the prior art. By incorporating a large volume of low density filler material with the other ingredients, provides a mixed slurry several times greater in mass, both before, and after dewatering, than is the case with sheets made of only cement and asbestos. My preferred product contemplates the use of a large volume of filler, so when consolidated by application of pressure, the product will have a uniform distribution of components and still be of lower density than sheets of the prior art. It seems that the filler material also provides a cushioning result when subjecting the felted mass of relatively wet materials to pressure. I have observed that the cement content is more uniformly distributed throughout the product, substantially eliminating the tendency to distort. The density of my product, dried to constant weight, may be as low as twenty pounds to the cubic foot.

By virtue of laying my sheet product in an unset plastic state, along with the use of these fillers, I substantially prevent distortion of the sort found in shingles of the prior art.

It appears that the rate at which my product loses moisture, while installed on the roof, and takes form with cement to cement bond, is one of the reasons for its stability in place, after set and cure.

There are other indications that prevention of substantial distortion of my product may be attained by applying colored latex films over the surface of the sheets after the sheets are laid on the roof. Such treatment prevents to a substantial degree, the rapid loss of the water of hydration, from the cement and consequent dusting.

Migration to the surface of the sheet of solubles that form upon contact with the carbon dioxide of the air, an insoluble white deposit, is substantially eliminated by application of silicone water repellant in a proportion of five parts resin to 95 parts mineral spirits. For some reason, this treatment also seems to retard distortion of my product. It seems that perlite is wetted readily with silicone applications and may well be the reason why such great penetration is attained in my product as compared to ordinary concrete.

Water alone, does not readily wet most forms of volcanic ash. The addition of wetting agents in forming my product, brings about most satisfactory results.

In reference to cement to cement bond throughout my present invention, I am not referring in any sense, to thermoplastic cement, asphalt coatings, by which asphalt shingles sometimes become bonded by extreme heat in weathering on a roof.

When I attain cement to cement bond, I refer to a hydraulic cement, or where in setting of a hydraulic cement in place on a roof it becomes bonded to a suitable coating of a water dispersed, or emulsified coating that is film forming.

A still further object is to provide a cement slab or sheet for roofing and siding, wherein the unset product may be fastened by suitable means to the surface to which applied, and having cement to cement contact to seal the lap joints and the fastening means at desired points in order to secure one to the other and to prevent leakage in said areas.

Other objects and advantages of my invention will become apparent from the following description.

FIG. 1 is a plan view of the shingle with the carrier plate on top of the unset shingle after placement on roof surface.

FIG. 2 is a plan view showing one of the carrier plates removed and the fastening means driven into the unset soft cement fibrous shingle.

FIG. 3 is an assembly of the shingles with the overlap of the shingles shown.

FIG. 4 is a cross sectional view showing the carrier plate in position on top of the unset shingle as it would lay on the roof along line 4—4 of FIG. 1.

FIG. 5 is a plan view of the carrier plate shown in FIG. 4.

FIG. 6 is an enlarged cross-sectional view through the carrier plate, taken on line 6—6 of FIG. 5.

FIG. 7 has relief taper like FIG. 6 to permit ready removal from under nail heads and shows how the carrier plate may nest for reuse.

FIG. 8 shows plan view with slots for nailing into unset shingle and hole for withdrawal of carrier plate together with side edge lips along line 9—9.

FIG. 9 is modified view where carrier plate has a bent down flange for ready release of product.

FIG. 10 shows stacked relationship of FIG. 8.

FIG. 11 shows the unset form fitting shingles laid over wood shingles or similar surfaces.

FIG. 12 shows a carrier plate in supporting position of the unset cement shingle ready for application by the roofer.

FIG. 13 shows two shingles in end lapped relationship.

FIG. 14 shows an assembly in the dutch-lapped fashion of application.

FIG. 15 is an edge view of FIG. 13.

FIG. 16 is an edge view of FIG. 14.

FIG. 17 is a plan view of a modified manner of laying unset cement fibre shingle slabs wherein the product may with sealing features more readily be laid over courses below while in their unset state of cure.

FIG. 18 is a lapped over end view of unset sheets laid over a smooth surface.

FIG. 19 is an edge view of FIG. 17.

FIG. 20 is a sectional edge view of old wood shingles covered by my unset form fitting cement product in overlapping relationship.

FIG. 21 is an edge view showing how my unset fibrous shingle follows the general contour of the stepped shingle courses over which they have been applied when my unset product is in an extremely soft low density form.

FIG. 22 shows what takes place in set rigid cement shingles when a nail is driven to place in the preformed hole of a hardened cement shingle.

FIG. 23 shows a nail being driven into an unset relatively soft cement fibrous shingle.

FIG. 24 is a similar view to FIG. 23, with the nail showing driven in having the snug fit, and having compressed the unset cement fibrous roofing.

FIG. 25 is a plan view of the roofing laid in overlapped relationship with nails buried below the face of the product.

FIG. 26 is a section of an unset fibrous sheet of tapering form blind nailed to depress and secure at desired areas the unset sheet so the overlapping unit may nest therein.

FIG. 27 is a sheet of unset cement and fibre formed on and between a suitable flexible carrier so when unrolled the unset product may be laid over another sheet and board deck, and secured thereto.

FIG. 28 shows a roller compressing the unset cement fibre product at lapped joints to cause a bond and protect against leakage from the elements, the surface over which the sheets are applied.

FIG. 29 shows granules being rolled into the unset product after application of the sheet product as laid over a roof deck.

This product may be made by board forming machines such as described in my Patent No. 2,722,868 and utilize the types of fabric, metal or reticulated sheets therein described as support or reinforcement for my roofing.

In general the present invention is directed to a means by which roofing and the like may be manufactured at or near the location of the place where the end product is to be applied. This system of application does not lend itself so well to practical use, where the period of storage, and shipping time, exceeds the normal setting periods for hydraulic cements, for example, cements such as Portland or similar products.

I have found however that by use of portable wet forming dewatering equipment, I can make at a practical rate of production, a felted cementitious sheet product, and get the product into place on a roof with the greatest advantage. Gravel and sand concrete when once placed, must so remain until set. After setting only, may the forms be removed. My method does not apply to poured concrete of merely sand and cement, as fractures would occur in handling.

My sheet roofing product requires no such forms as employed for conventional concrete and may be transported outside of any container before becoming set or hard.

I have found by the use about 5 to 20% by weight of chrysatile asbestos fibre of a nominal fibre length, together with from 80 to 95% by weight of cement, that I may by vacuum dewatering, then form, and carry on a reticulated carrier plate, one or more, large slabs of roofing material to the point of application on a roof deck, laying the product in place without fracture of the material.

My usual procedure is to progressively make my product by first depositing in a large volume of water, from 5 to 20% by weight of fibre (the quantity depends somewhat on the character of the fibre). I then add thereto, after the fibre has been dispersed, in the water, from 5 to 35% by weight of filler material weighing from 5 to 30 pounds to the cubic foot (loose fill). The hydraulic cement is then added in an amount of about 70 to 95 parts by weight. This mixture is kept in constant agitation until all of the components are wetted, at which time it is dewatered through a screen, there forming a relatively soft cake of desired thickness. Pressure may or may not be applied to further consolidate and densify the mass, or provide designs on the sheet or shingle material. Examples of formulas that have been successfully used in making my product by the present invention are:

|  | (1) percent | (2) percent | (3) percent | (4) percent | (5) percent |
|---|---|---|---|---|---|
| Fibre | 15 | 5 | 5 | 15 | 5 |
| Filler | 30 | 35 | 30 | 5 | ------- |
| Cement | 55 | 60 | 65 | 80 | 95 |
|  | 100 | 100 | 100 | 100 | 100 |

After the product has been formed and deposited on the carrier means, for example, a wire screen or plate, the product is carried to the roof, lined up with the lower edge of the roof line, then flipped over leaving the carrier means on top of the unset shingle product, like shown in FIGS. 1, 2, 3. This is one of the methods employed where it is desirable to utilize the carrier as a temporary protective means during the initial cure of the form fitting unset roofing sheet.

For convenience the term "sheet" will be used in the sense of defining any form of shingle or rolled roofing.

It is to be understood that the term "carrier" shall define a support for handling and placement of the sheet material, whether it be a temporary or a permanent attachment of the unset sheet. Moreover it is to be understood that the carriers may be positioned and left under the unset sheet material, either as a temporary or permanent fixture. The carrier may be made of fabric, metal foil, or any reticulated material, such as described in my Patent No. 2,722,868.

In the case of using the carrier underneath the unset sheet, removal may be accomplished by either pulling from beneath the sheet, said carrier or in the case of rolled sheet, lifted off, if desired, after the sheet has been secured and before it has become set and hard.

When it is found desirable to remove the unset sheet as a shingle of relatively small size, I have found that it may be to advantage to best place the unset product in place, by holding the carrier in a fixed position then sliding the shingle off in registration of the other component parts of the roof.

In accomplishing the greatest ease in removal of the sheet from a carrier, a fine screen cloth or smooth metal sheet as shown in FIGS. 1 to 10 is preferred.

In rolled roofing, either a screen, cloth, or metal carrier may be employed, all depending on whether or not it is desired to form and dewater the product, on or off of the carrier. Such carriers may be used for transporting the sheet product in manufacture, application, or end use.

In actual practice I have discovered that in applying my sheet material over old gravel and mineral surfaced roofs, that fasteners for my sheet covering are not always necessary. That is because of the fact that the unset, relatively soft, fibrous sheet forms around, and adheres to a substantial degree, to the rough surface of the old roof covering even though substantially dewatered.

Moreover I have found in old roof coverings that protruding nails, which have worked up above the surface of the old coverings are an advantage in further holding in place the massive slabs of unset fibrous sheet material. Such advantages reside only in substantially thick sheet coverings of the order of, one half to one inch or more. It may be seen that following set, of the unset cement sheets after application, that the fasterners in the roof surface below, may not further work out of place. In cases it is of course, desirable to have the fasteners driven back in. After hardened, my product does not readily puncture. Such a result is a distinct advantage over older roofing products that puncture or crack as a result of rough surfaces to which applied.

A very important advantage in form fitting my fibrous cement unset sheet over uneven old worn roof coverings, is in the fire protection then afforded to the under covering since substantially close fitting the lower surface. In most cases the old roof has become dried out and susceptible to shedding of the gravel or granules, and my product prevents further loss becoming bonded thereto.

This invention is directed to the protection of old worn sand or gravel surfaced roofs, the prevention of shedding of the surface, thereof by having the fibrous cement components of my new covering, hold in place, and insulate against the weather, the components of the roof over which the new product is applied.

I make no claim to poured on concrete as it applies to protecting old or new roof surfaces in set, or unset condition.

I have discovered in laying down preformed unset fibre containing products of the formula as set forth in the examples heretofore provided, that I may weatherseal these joints by laying these sheets, in butt edge relationship. After so placing, I apply by hand, ample pressure so as to actually unite, or otherwise weld together, in interlocked relationship the fibre and cement components of one sheet, to another.

The results attained in the treatment of my product is unique. Sealed unbroken joints in my product prevails because of its density as made, laid, and form fitted, and while in a non-fluid state of application. I have found that my product in its unhardened sheet form, may be advantageously pressed in and around roof fixtures such as vents, corners and ridge contours without severe disturbance of the fibre lay of my sheet material which provides the tensile strength, impact resistance, and other nonflowing characteristics all so important in my approach in having handleability during application to the various surfaces.

Hydraulic cements take their set by combining chemically and the term cements as contemplated in this invention is a cement that is first plastic, and then becomes set and continues to harden by chemical action.

The use of the word "felting" is to describe the interlocking relationship of fibre to fibre matting, in the formation of my sheet material. The felting characteristics of my product contribute materially to the handleability in its application, particularly in application over surfaces while the product is still flexible and relatively soft. In my product it is not of great importance that it be very dense, or in fact, as strong as would be required if it were first set, cured, hard, and brittle before being applied, as in the case of shingles of the prior art. My new method permits of less strength for weight ratio in the product. Because of the use of a carrier to facilitate further, the handleability of low density sheets, I am able to incorporate a large volume of low density filler material for insulation.

I provide a product light enough in weight to handle without substantial fractures as it is made, laid and used.

A carrier is not always required in removing the sheet after felting and dewatering, though when so removed, a large volume of fibre, well felted, is preferred. With such procedure, one may transport it so long as it holds together and carries its own weight for handling, without fracture. While laying such a product in unset and relatively soft state, of course, greater care must be exercised as compared to transporting with a carrier, and so applied to a roof.

Since a low density roof which furnishes insulation is highly desirable, I generally employ for such an objective, a low density volcanic ash, perlite, pumice, or the like, within the limits of the range shown in the examples given above and defined as "filler" material. Such filler is best suited to serve as an aggregate in order to keep the weight of the product low.

With my low density sheet, I find a vapor barrier is usually required to prevent excessive absorption, and in my product, I have found sprayed, rolled or poured coatings of emulsified resins (synthetic or natural), pitch, latex or wax are quite as satisfactory, as integral waterproofing. That especially holds true when these substances are applied while in the process of dewatering the product by vacuum equipment. The protective water repellant substance is drawn thereby, into the sheet, or onto the surface of the felted sheet to aid the cure and impart color. The use of Silicone water repellants in surface finishing of my product has the distinct advantage of preventing to a substantial degree, the migration of soluble salts from certain cements I sometimes employ as a binder.

In FIG. 1, reference character 1 is a roof surface over which has been laid a roofing sheet 2 which in this instance is in shingle form. The sheet is covered by a carrier 6 having a flange or lip 5 designed to protect and hold in place or assist in removal of carrier 6 from said sheet 2. The carrier 6 is for conveying the sheet and to facilitate laying of the sheets. The slot 7 is designed to provide a place through which to nail the sheet 2 when it is desirable to support the whole of the sheet, or cover it. The carrier 6 may be thereby removed with greater ease, at any time. The slot 7 being open at one end permits the removal of the carrier 6 from the shank of the nail shown at 8 in the assembly of the sheets 2. In FIG. 2 it may be seen that at the extreme right, of FIG. 2, the carrier 6 has been removed to expose the sheet in its position, the nail head 9 holding the sheet at registration with the lower edge of the roof 10. The butt edge of the sheet has been cut off at that point while the sheet is soft, then serving as one of the course of sheets employed, like the others and overlapped so as to form in the end, a complete roof covering. In FIGS. 1, 2 and 3 the corners are shown in registration and laid by the so-called French method. No claim is made to the shape of the sheet in the present invention or to the proportions or extent of exposure to that of the covered portion.

FIGS. 1, 2 and 3 clearly show steps taken in application of the sheets 2 laid up in registration, with carriers covering the sheets in certain areas. The carriers are sometimes left in position for convenience in getting about over the roof when the sheets are in a very soft condition and before becoming set and hard. There are instances where the carrier is left on the roof as a permanent surface, in which case the sheet is at times preferably formed into an extremely low density in order to provide the maximum insulation to the roof. The sheets 2 are, as in each instance, applied while in an unset state and relatively flexible. In that condition I have found that I may use metal foil as a carrier to transport, apply and protect the unset sheets, and roof over which they are applied. In the case of the carriers being of thin metal, the carrier form fits into position with the sheet 2 or the sheet 2 conforms to the foil. In this manner any of the carriers 6 may be used on top of the sheets 2 or underneath the sheet 2. When warranted, while considering the type of protection called for, cure of the sheets, weather protection, impact resistance, while the sheet is soft and weather resistant after the sheet becomes hard are important features of the present invention. To combine the laying of rigid or flexible carriers as shown in FIGS. 1, 2, 3, 4, 12 with a dewatered unset sheet, is a distinct advantage over preformed insulation that has been produced at a factory and is first dried, cured, and packaged at that point. With less handling of the unset sheet, and no handling of a cured, hard and brittle product, great savings are at hand.

The modified edge views as shown in FIGS. 5, 6, 7, and 9 seem to require no further comment. FIG. 8 is a plan view of FIG. 10 and has two recesses 7 for receiving nails 9 and a hole 10, with a raised lip to aid in removal of the carrier 6.

FIG. 11 shows an assembly of my new sheet product in overlaping relationship over wood shingles clearly showing how the unset, relatively flexible and compressable shingle follows the contour of the roof below and in providing support for the new product in its flexible, limp, and uncured state, before becoming set and cured.

I have not shown the coatings, water repellants, employed to protect the uncured product, nevertheless it is to be understood that protection of the surfaces and the integral body of the sheet, is of importance as it concerns its cure in all kinds of weather. It is to be noted that the fibre to cement, and cement plus fibre mixed with filler and dewatered makes possible the assembled roof over steep as well as flat roofs. The problem of proper cure is solved by the retention of sufficient water after placement on a steep roof. I attain satisfactory cure by incorporating integral waterproofing or surface treatments. The carriers 6 also contribute to the transfer of sealing substances to hold color and protect in general, the surfaces of the unset, uncured faces of the sheets. These sheets 2 must be dewatered to a degree that will avoid excessive drip onto the sheets below, however still wet enough, so as to provide sheet to sheet bond. Such treatments minimize the chance of leaks through narrow lapped joints such as shown in FIG. 26 at nailed location 9 where the nail is covered by a narrow depressed lap joint.

Referring to FIG. 13, you will note that the two sheets are laid with overlapped ends as in the case of FIG. 14, which shows the starting points for three courses of sheets. With the relatively small overlap as shown by the proportions of the covered portion to that of the exposed portion, it will be seen that a sealed lap becomes important to avoid leakage at that point. With shingles and tile that are rigid when laid, narrow laps become a problem due to leakage at that point. With my unset non-rigid shringle, I may, with slight pressure at the narrow laps, bond together these portions of the shingles by setting of the hydraulic cement at those points. In FIG. 15 and FIG. 16, the importance of a monolithic bond may be seen in order to avoid leakage. Where hand pressure is insufficient to weld, press down, and seal such laps or joints, I may use a roller as shown in FIG. 28 to seal the laps and bring the two sheets substantially into one plane for a smooth surface appearance. When rough irregular surface contours are desired, the sheets are laid as shown in FIG. 17 and clearly seen in the edge view FIG. 19. In FIG. 18 it will be seen how the tapered shingle more closely conforms to the surface over which it is laid, leaving a minimum of air space between the sheet itself and the deck over which it is applied as shown at 14. When it is desired to simulate small shingles while retaining long sheets and narrow laps, the unset relatively soft and fibrous sheet may under application of pressure, have designs made in its face. While so doing, advantages are had by bringing the whole of the shingle in closer relationship to the contours over which it rests. I have found that with fibre content of 5 to 20 percent by weight of the product, that the fibre prevents the sheet from spreading too much and that when compacted as by hammer blows, only becomes more dense and strong following set, and becoming hard.

In FIG. 20 it will be seen how depressed, unset, overlapping sheets may be treated while in that degree where they may be indented, formed, and compacted as at 12. With the lap 12 sealed in addition to be depressed below the surface of the adjacent sheet, real weather protection is afforded. FIG. 20 sheet assembly is shown laid over curled wood shingles 11. FIG. 21 is sectional view that shows how a soft low density unset sheet takes form over the shingles 11.

In further reference to FIG. 22 it will be understood the showing is that of a preformed rigid, highly pressed, hardened shingle that has prepunched holes for driving nails into the surface to which applied. Such conventional asbestos cement shingles are seldom applied without undue breakage in shipment and application, and fracture when the nail is driven in with excessive impact. Since there is never a uniform close relationship with the surface below as at air space 14, leaks occur.

Again referring to FIG. 23 it is to be noted that the nail 9 is pressed in by hand (the hand not shown) and there held ready for a hammer blow, which sets the nail as shown in FIG. 24. The shank of the nail is intimately surrounded by the sheet material of my product which soon becomes set and hard as it shrinks around and bonds to the nail's shank as at 16 with the nail at least flush or below the surface densifying the material for greater strength at that point. A like condition is shown in FIG. 26 at 16.

FIG. 27 shows an advanced method of laying rolled roofing sheets which are first formed into a web on suitable dewatering equipment and then, preferably dewatered while on the carrier with which it is run up into rolled form. A mandrel core 17 serves to hold the roll in shape while winding the carrier 6 and the sheet 2 onto the core 17. In the illustration in FIG. 27, the uncured, relatively soft sheet is shown wound as an outer layer for certain advantage, unrolling onto the roof in lapped over courses. With perhaps certain disadvantages, the sheet 2 may nevertheless be wound inside of the carrier 6, which must be porous if the carrier is used on which to form the sheet, during the dewatering cycle and while used to transport and lay the sheet upon a roof or like surface. In any other manner of forming the sheet 2, the carrier may be metal, strong flexible board, plastic sheet material or paper. Glass cloth and other reticulated material is sometimes an advantage where it is desired to keep the weight to a minimum for ease in carrying in the rolled form onto the roof. The carrier is washed and reused when desired after removal from the sheets 2.

FIG. 29 shows a similar sheet with granules 18 buried for surface wear and color, and with the sheet in place for cure and weathering purposes.

In any one, or all of my proposed sheets, I may use slurries of various density and consistency, and mix together in any chosen sequence, such components in order to attain the best results. Several different slurries may be employed in the forming of my product. In the making of sheet laminates and for purpose of simplification, one of the preferred approaches is set forth in the present invention as follows:

Example: In order to assure maximum water resistance in my product, I first place in a suitable mixer, a large enough volume of water to thoroughly disperse while agitated, from 5 to 20 percent fibre to the weight of cement added. To this slurry, I incorporate sufficient low density filler to provide a slurry of correct density for the particular end product. After a thorough mixing of the slurry, it is deposited on a filtering surface where the water is partially withdrawn. While during this dewatering step and unpressed state, and still on the filtering surface, I deposit thereon another slurry comprised of waterproofing ingredients in dispersed or emulsified form, and again draw off by suitable dewatering means such fluid as is contained in the waterproofing substances. Such a procedure will form the most effective vapor barrier at one or more levels of the formed sheet. Repetition of these steps is contemplated for certain end uses.

In certain cases organic pulp (kraft or waste paper) for example, is employed, and in amounts great enough to have intimate fibre to fibre felting and thereby prevent parting of my monolithic sheet during application of the sheets. In use of such fibre, it is highly desirable to first treat the fibre, organic or inorganic, with a silicone resin, one that has been dispersed in a suitable fluid. I have found both caustic and mineral solvents may be used to disperse silicones, for the impingement of hydrophobic films on the fibres as used in my present product. Such treatment prevents adsorption and absorption (water onto, or into) the fibre. With such use, several advantages are brought about. In mixing the pretreated fibre in water, together with the cement and filler, the water is then better able to properly hydrate the cement and the fibre has little or no effect on the cements set. Moreover the fibre so treated, then has greater freeness. The term "freeness" is used to describe the rate at which pulp components may be dewatered. I have found that silicone pretreatment of the fibre and filler, materially improves the sheet formation, and speeds up the rate of dewatering of the sheet, water repellancy, distortion, dimensional stability, in place when becoming dry, or again subject to wetting as the product weathers in place. Sometimes I treat the fibre with silicone dispersions then dry the fibre to set the silicone on the fibre prior to its use in the mixture with other fluids and solids. The term fluids shall be interpreted as solids that may be made fluid, as well as liquids and gases.

While I have described the preferred embodiments of my invention, I am not limited to any of the details set forth herein, except as described in the appended claims.

I claim:

1. A dry protective covering in sheet form applied wet and unset comprising felted fibers mixed with hydraulic cement and a filler material, said sheet having a density range of 20 to 55 lbs. to the cubic foot.

2. A roof covering comprising of an unset sheet of water dispersed and felted fiber, hydraulic cement, and a low density filler, said sheet covering being substantially nondistorting following its application, during its set, cure and weathering period.

3. A weather protective covering on the surface to be protected comprised of sheets superimposed on each other, said sheets comprising unset cement, felted fiber, and low density filler, said covering before setting having a non-shattering resistance under impact.

4. A plurality of surface covering sheets comprising felted fibres and unset cement, said sheets being superimposed on each other and having a cement to cement bond with each other.

5. A surface covering sheet comprising a substantial amount of denodulated silicone resin treated fibre in cement, said treated fibre having felting qualities such as to hold the cement in contact with the fibre without adversely affecting the normal setting of the cement.

6. A surface covering in the form of a sheet comprising cement and fibre pretreated with synthetic resins to prevent the fibre from retarding the setting of the cement, said cement being unset.

7. A surface covering in the form of a sheet comprising cement and fibre pretreated with silicone to prevent the fibre from retarding the setting of the cement, said cement being unset.

8. An article of manufacture composed of a mixture of the following ingredients, by weight: 55 to 95 percent hydraulic cement, 5 to 20 percent asbestos fiber, 5 to 35 percent low density filler selected from the class consisting of volcanic ash and perlite and weighing from 5 to 30 pounds per cubic foot, and said fibers being felted with the cement and filler being dispersed throughout the felt.

9. An article as in claim 8, said article having a density of from 20 to 55 pounds per cubic foot.

10. A roof covering comprising an unset sheet of water dispersed and felted fiber, hydraulic cement and a low density filler, and a reticulated carrier permanently attached to said sheet.

11. A protective covering in unset sheet form comprising water dispersed and felted fiber, hydraulic cement and a low density inorganic filler, said sheet when dried having a density of between 20 to 55 pounds per cubic foot.

References Cited in the file of this patent

UNITED STATES PATENTS

| | | |
|---|---|---|
| 768,009 | Boulter | Aug. 16, 1904 |
| 1,123,266 | Farnham | Jan. 5, 1915 |
| 1,829,187 | Piessevaux | Oct. 27, 1931 |
| 2,044,788 | Harshberger et al. | June 23, 1936 |
| 2,161,440 | Venrick | June 6, 1939 |
| 2,210,209 | Kirschbaun | Aug. 6, 1940 |
| 2,246,514 | Hardy | June 24, 1941 |
| 2,246,537 | Rembert | June 24, 1941 |
| 2,335,722 | Adams | Nov. 30, 1943 |
| 2,379,051 | Wallace | June 26, 1945 |
| 2,388,060 | Hicks | Oct. 30, 1945 |
| 2,441,423 | Elliott | May 11, 1948 |
| 2,507,200 | Elliott et al. | May 9, 1950 |
| 2,610,555 | Romano | Sept. 16, 1952 |
| 2,634,208 | Miscall | Apr. 7, 1953 |
| 2,646,373 | MacMullen et al. | July 21, 1953 |
| 2,715,583 | Ziegler | Aug. 16, 1955 |
| 2,717,537 | Chapman | Sept. 13, 1955 |
| 2,738,285 | Biefeld | Mar. 13, 1956 |
| 2,750,030 | Tierney | June 12, 1956 |
| 2,772,774 | Rabuse | Dec. 4, 1956 |
| 2,785,987 | Blake | Mar. 19, 1957 |

FOREIGN PATENTS

| | | |
|---|---|---|
| 12,406 | Holland | Jan. 15, 1925 |
| 587,556 | Great Britain | Apr. 29, 1947 |